(12) United States Patent
Patel et al.

(10) Patent No.: US 6,887,951 B1
(45) Date of Patent: May 3, 2005

(54) SOLVENT BASED EPOXY-PHENOXY SOLUTION AND LACQUERS OR INKS FORMED THEREFROM

(75) Inventors: Mukund R. Patel, Hudson, MA (US); Robert E. Lafler, Charlton City, MA (US)

(73) Assignee: Gotham Ink Corporation, MA (US)

( * ) Notice: Subject to any disclaimer, the term of this patent is extended or adjusted under 35 U.S.C. 154(b) by 19 days.

(21) Appl. No.: 10/406,734

(22) Filed: Apr. 3, 2003

Related U.S. Application Data

(62) Division of application No. 10/041,812, filed on Jan. 7, 2002, now abandoned.
(60) Provisional application No. 60/265,537, filed on Jan. 31, 2001.

(51) Int. Cl.[7] .......................... C08L 63/00; C08L 61/28
(52) U.S. Cl. .................. 525/524; 525/523; 525/529; 525/540; 525/930; 523/453; 523/454
(58) Field of Search .................. 525/930, 529, 525/540, 523, 524; 523/453, 454, 429; 528/87, 88

(56) References Cited

U.S. PATENT DOCUMENTS

| | | | |
|---|---|---|---|
| 3,177,090 A | * | 4/1965 | Bayes et al. .............. 428/414 |
| 4,111,870 A | * | 9/1978 | Den Hartog et al. ....... 428/414 |
| 4,321,185 A | | 3/1982 | Benitez |
| 4,511,682 A | | 4/1985 | Mayer et al. |
| 4,927,709 A | | 5/1990 | Parker |
| 4,935,300 A | | 6/1990 | Parker |
| 4,976,813 A | * | 12/1990 | Salensky et al. ............ 156/230 |
| 5,800,656 A | | 9/1998 | Geurtsen et al. |
| 5,824,176 A | | 10/1998 | Stein et al. |
| 5,883,170 A | * | 3/1999 | Tanaka et al. .............. 524/413 |
| 5,968,689 A | | 10/1999 | Torikoshi et al. |
| 5,989,700 A | | 11/1999 | Krivopal |
| 6,033,763 A | | 3/2000 | Laprade et al. |
| 6,099,944 A | | 8/2000 | Laprade et al. |
| 6,322,620 B1 | | 11/2001 | Xiao |
| 6,537,651 B2 | | 3/2003 | Geurtsen et al. |
| 2003/0134110 A1 | | 7/2003 | Laprade |

OTHER PUBLICATIONS

J. Schwartz, "Labelled for Growth", Advertising Age, Nov., 1999, 45–47.
Belland Inc. Advertisement, "Labels with a solution", undated (5 pages).

* cited by examiner

*Primary Examiner*—Michael J. Feely
(74) *Attorney, Agent, or Firm*—Cowan, Liebowitz & Latman, P.C.; Mark Montague

(57) ABSTRACT

The present printing process provides a multilayer coating system comprising a low viscosity, latent, heat-curable thermoplastic adhesive layer, colored ink interlayer, and an abrasion-resistant top lacquer layer that can be utilized for production of heat transferable labels suitable for labeling bottles and other containers that are subjected for over ten cycles to immersion in heated aqueous sodium hydroxide solution for cleaning prior to re-use.

2 Claims, 1 Drawing Sheet

SOLVENT BASED EPOXY-PHENOXY SOLUTION AND LACQUERS OR INKS FORMED THEREFROM

CROSS-REFERENCE TO RELATED APPLICATIONS

This application is a division of U.S. patent application Ser. No. 10/041,812, filed Jan. 7, 2002, now abandoned which claims the benefit of U.S. Provisional Patent Application Ser. No. 60/265,537, filed Jan. 31, 2001.

FIELD OF THE INVENTION

The present invention relates to gravure printing processes. More particularly, the invention relates to non-blocking thermoplastic adhesive coatings suitable, upon being melted, for bonding to untreated glass, silane-treated glass, metallic, and heat resistant plastic surfaces, being of sufficiently low viscosity to be applied by gravure coating methods, dried, then overcoated with a colored area or design, dried, and subsequently covered with a hard, caustic resistant, abrasion resistant, clear, solvent-based coating.

BACKGROUND OF THE INVENTION

Use of previously available catalyzed cured epoxy coatings for heat transfer label applications have been limited due to the following deficiencies: short pot life, excessively high viscosity unsuitable for gravure application, loss of thermoplasticity due to premature cross-linking when stored in a tightly wound, block-free roll, and loss of adhesion, film strength, and clarity upon immersion in a heated aqueous caustic bath for more than several cycles. Thus, there is a need for an improved coating system for heat transfer label applications which exhibit better characteristics when subjected to the type of handling and conditions normally encountered in the industry.

OBJECTS OF THE INVENTION

It is an object of the invention to provide a multilayer coating system particularly suitable for use in the production of heat transferable labels suitable for use in labeling bottles and other containers.

It is another object of the invention to provide a multilayer coating system particularly suitable for use in the production of heat transferable labels suitable for use in labeling bottles and other containers, which exhibit superior performance characteristics when the bottles and other containers to which the labels have been applied are subjected to multiple cycles of immersion in a heated aqueous caustic bath prior to reuse.

It is yet another object of the invention to provide improved heat transfer labels comprising the multilayer coating system of the invention.

These and other objects of the invention will become more apparent from the discussion below.

SUMMARY OF THE INVENTION

The present invention provides for coating formulations comprising blends of solid epoxy resins with solid phenoxy resins of such proportions that, upon dissolution in suitable solvents, result in a viscosity low enough for application by etched gravure rolls, either solid or design in format, with clean, non-stringy filling and release from the gravure cells.

Additional necessary components of these formulations are a highly monomeric methyl butyl coetherified melamine-formaldehyde resin (Resimene CE7103) and a blocked dinonyl napthalene (mono) sulfonic acid catalyst (Nacure 1557). These materials enable the coatings to be applied and dried tack free on the desired substrate without losing their thermoplasticity and later, during the final curing conditions of exposure to from about 375° to about 400° F. for from about 15 to about 20 minutes, develop the desired caustic resistance by effectively cross-linking the epoxy-phenoxy blend. Optionally, a colored ink that may be utilized as an interlayer and formulated with the same resin-curing agent-catalyst combination may be applied to the topcoat and dried before the adhesive coating is applied and dried.

An additional, modified heat activatable labeling system applied directly to the glass, silane-treated glass, metal, or heat resistant plastic can be manufactured by applying the above-described chemical compositions to a printed film or paper-like substrate or a similar material rather than to a wax, ultraviolet cured, polyethylene, polypropylene or silicone release-coated substrate.

The construction and obvious advantages of the system provided for by the present invention will be more clearly understood from the following description of the various specific embodiments when read in conjunction with the accompanying drawings.

DETAILED DESCRIPTION OF THE INVENTION

Figure 1:
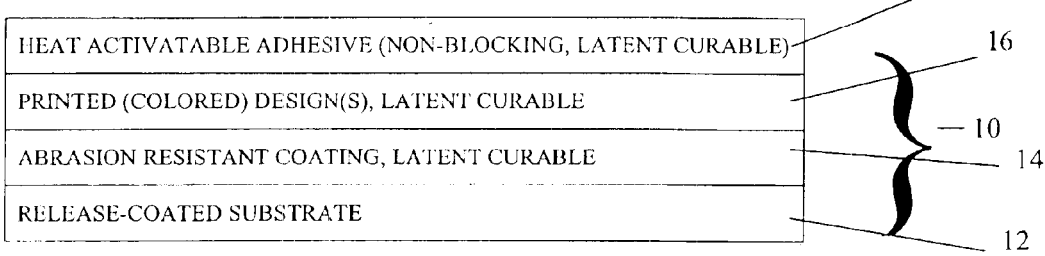
FIG. 1 is a schematic cross-sectional view of one embodiment of the invention.

The present invention is directed to non-blocking thermoplastic adhesive coatings suitable, upon being melted, for bonding to untreated glass, silane-treated glass, metallic, and heat resistant plastic surfaces. The coatings are of sufficiently low viscosity to be applied by gravure coating methods, dried, then overcoated with a colored area or design, dried, and subsequently covered with a hard, caustic resistant, abrasion resistant, clear, solvent-based coating.

The coating compositions utilized in this invention are based on the following components:

The resin mixture consists of a 50/50 blend of EPON 1007F with Paphen PKHH. Alternatively, EPON 1009F maybe substituted for EPON 1007F.

Epon 1007F is a bisphenol A/epichlorhydrin based epoxy resin having a viscosity of 50 to 100 centipoises when dissolved at forty percent by weight in methyl ethyl ketone, a melt viscosity of approximately five hundred poise at 150° C., a melt point of 120° to 130° C., and an epoxy equivalent weight (the weight of the resin, in grams, which contains one gram equivalent of epoxide) of 1700 to 2300. EPON 1009F is a bisphenol A/epichlorhydrin based epoxy resin having a viscosity of 100 to 250 centipoises when dissolved at forty percent by weight in methyl ethyl ketone, a melt viscosity in excess of five hundred poise at 150° C., and an epoxy equivalent weight of 2300 to 3800. These resins are proprietary products supplied by the Shell Chemical Company, 3200 Southwest Freeway, Houston, Tex. 77027.

D.E.R. 667 is a solid, medium molecular weight, bisphenol A-based epoxy resin having an epoxy equivalent weight of 1600 to 2000. D.E.R 669 is a solid, high molecular weight bisphenol A-based epoxy resin having an epoxy equivalent weight of 3500 to 5500. Both of these resins are supplied by the Dow Plastics Division of the Dow Chemical Company, 2040 Dow Center, Midland, Mich. 48674.

The phenoxy resin, PKHH, is a solid poly(hydroxyether) phenoxy resin (C.A.S. No. 25068-38-6) with the chemical structure:

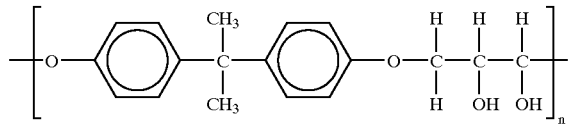

Where n = 38 to > 60.

The PKHH resin has a molecular weight, Mn, of 10–16,000, a glass transition temperature of 98° C., and a theoretical hydroxyl equivalent weight of 284. It is manufactured by Phenoxy Specialties, 800 Cel-River Rd., Rocky Hill, S.C. 29730.

The cross-linking agent used as latent reactant with the hydroxyl groups on the epoxy and phenoxy resins is the highly monomeric proprietary grade of methyl/butyl coetherified melamine-formaldehyde resin containing almost no polar functional groups such as imino or methylol. This latter property contributes to extremely good hydrolytic stability resulting in reduced viscosity increase. The specific melamine-formaldehyde resin used in our coating formulation is Resimene CE-7103, a clear, colorless, semi-viscous liquid having a pH of 7.0, a solids content of 98% minimum, a free formaldehyde content of 0.1% maximum, and it is a product of Solutia, Inc., 10300 Olive Boulevard, St. Louis, Mo. 63166-6760.

The blocked catalyst in the formulations of the invention, as a necessary component for providing greater package stability and reducing catalyst-pigment interactions, is a dinonylnaphthalene(mono)sulfonic acid type supplied at twenty-five percent activity in a solvent blend of thirty-nine to forty-three percent n-butyl alcohol (C.A.S. #71-36-3) and twenty-three to twenty-seven percent ethylene glycol butyl ether (C.A.S. # 111-76-2). This catalyst is a proprietary product of King Industries, Inc., Science Road, Norwalk, Conn. 06852.

In addition to the above mentioned components, solvents are utilized as a means of lowering viscosity and surface tension, reducing stringiness, and enhancing drying, thereby improving press performance and resulting in the ability to run cleaner and longer at increased press speeds. The solvents used for these purposes are methyl ethyl ketone (C.A.S. #78-93-3) and toluene (C.A.S. #108-88-3).

One or more pigments may be used as colorants for these epoxy/phenoxy solutions. Pigments found to be compatible in these systems include:

Naphthol Red 7035 C (C.I. Pigment Red 266) supplied by Capelle Inc., 39 Secor Road, Scarsdale, N.Y. 10583; Kronos 2020 Titanium Dioxide (C.I. Pigment White 6) supplied by Kronos Inc., 6825 Northchase Drive, Houston, Tex. 77060; and 11-1101 Permanent Yellow G (C.I. pigment Yellow 14) supplied by Clariant Corporation, 500 Washington Street, Coventry, R.I. 02816.

With reference to FIG. 1, which depicts a schematic representation of one embodiment of the invention, shown are the various layers in the order of application to produce a heat transfer label 10, in accordance with the invention. Shown is a multilayer heat transfer label 10, comprising a release coated substrate 12, on top of which has been applied an abrasion-resistant coating 14, over which has been applied a printed (colored) design 16 and a final heat activatable adhesive layer 18.

Figure 2:
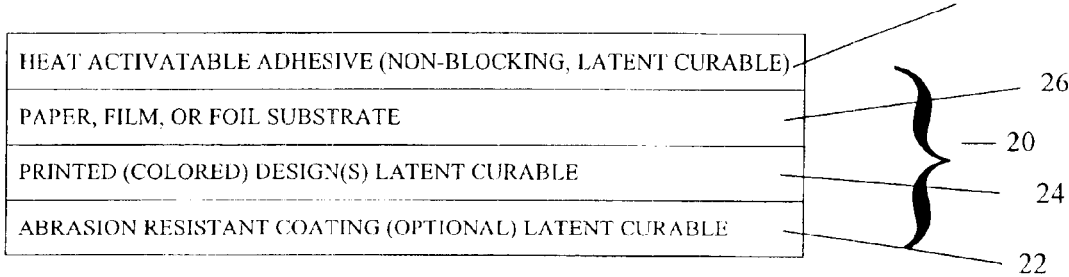
FIG. 2 is a schematic cross-sectional view of another embodiment of the invention.

With reference to FIG. 2, which depicts a schematic representation of another embodiment of the invention, shown are the various layers in the order of application to produce a direct applied heat activatable label 20, in accordance with the invention. Shown is a multilayered direct applied heat activatable label 20, comprising an abrasion-resistant coating layer 22, on top of which has been applied a printed (colored) design layer 24, a paper of foil substrate layer 26 is applied to the printed design layer, and a heat activatable adhesive layer 28 is then applied to one surface of the substrate 26.

Representative formulations illustrating the invention are shown in the following examples:

| | % BY WEIGHT |
|---|---|
| EXAMPLE I - THERMOPLASTIC ADHESIVE AND ABRASION RESISTANT TOPCOAT | |
| PKHH PHENOXY RESIN | 15.0 |
| EPON 1007F EPOXY RESIN | 15.0 |
| METHYL ETHYL KETONE | 46.0 |
| TOLUENE | 17.4 |
| RESIMENE CE-7103 | 6.0 |
| NACURE 1557 | 0.6 |
| | 100.0 |
| EXAMPLE II - THERMOPLASTIC ADHESIVE AND ABRASION RESISTANT TOPCOAT | |
| PKHH PHENOXY RESIN | 17.0 |
| DOW D.E.R. EPOXY RESIN 667 | 17.0 |
| METHYL ETHYL KETONE | 39.6 |
| TOLUENE | 19.8 |
| RESIMENE CE-7103 | 6.0 |
| NACURE 1557 | 0.6 |
| | 100.0 |
| EXAMPLE III - THERMOPLASTIC ADHESIVE AND ABRASION RESISTANT TOPCOAT | |
| DOW D.E.R. EPOXY RESIN 667 | 18.88 |
| EPONOL 53-BH-35 | 31.45 |
| METHYL ETHYL KETONE | 43.32 |
| RESIMENE CE-7103 | 5.70 |
| NACURE 1557 | 0.65 |
| | 100.00 |
| EXAMPLE IV INK/COLORED COATING | |
| PKHH PHENOXY RESIN | 10.0 |
| EPON 1007 F EPOXY RESIN | 10.0 |
| METHYL ETHYL KEONE | 27.0 |
| TOLUENE | 13.5 |
| KRONOS 2020 | 35.0 |
| RESIMENE CE-7103 | 4.0 |
| NACURE 1557 | 0.5 |
| | 100.0 |
| EXAMPLE V - INK/COLORED COATING | |
| PKHH PHENOXY RESIN | 12.50 |
| EPON 1009F EPOXY RESIN | 12.50 |
| METHYL ETHYL KETONE | 42.35 |
| TOLUENE | 21.15 |
| NAPHTHOL RED 7035C | 6.00 |
| RESIMENE CE-7103 | 5.00 |
| NACURE 1557 | 0.50 |
| | 100.00 |
| EXAMPLE VI - INK/COLORED COATING | |
| PKHH PHENOXY RESIN | 12.50 |
| EPON 1007F EPOXY RESIN | 12.50 |
| METHYL ETHYL KETONE | 42.35 |
| TOLUENE | 21.15 |

-continued

|  | % BY WEIGHT |
|---|---|
| NAPHTHOL RE 7035C | 3.00 |
| 11-1101 PERMANENT YELLOW G | 3.00 |
| RESIMENE CE-7103 | 5.00 |
| NACURE 1557 | 0.50 |
|  | 100.00 |
| EXAMPLE VII - ABRASION RESISTANT TOPCOAT | |
| DOW D.E.R. EPOXY RESIN 669 | 25.0 |
| METHYL ETHYL KETONE | 69.5 |
| RESIMENE CE-7103 | 5.0 |
| NACURE 1557 | 0.5 |
|  | 100.0 |

Use of above-described system enables one to obtain a gravure-applied, printed, heat transferred label with exceptional caustic resistance, specifically resisting immersion in three percent aqueous sodium hydroxide solution at 66° C. for four hours without significant degradation. This results in substantially increasing the number of times (from ten to twenty) that the labeled containers can be washed and re-used, thereby conserving materials, energy, and container manufacturing costs.

It will be further apparent to one skilled in this art that the improvements provided for in the present invention, while described with relation to certain specific physical embodiments also lend themselves to being applied in other physical arrangements not specifically provided for herein, which are nonetheless within the spirit and scope of the invention taught here.

We claim:

1. A solvent based epoxy-phenoxy solution comprising: a blend of solid epoxy resin and solid phenoxy resin, said blend dissolved in methyl ethyl ketone or a solvent blend of methyl ethyl ketone and toluene; a methyl- and butyl-coetherified melamine-formaldehyde resin; and a blocked dinonyl naphthalene (mono) sulfonic acid catalyst in a solvent blend of butanol and 2-butoxyethanol.

2. A protective lacquer coating or ink comprising a solvent based epoxy-phenoxy solution comprising: a blend of solid epoxy resin and solid phenoxy resin, said blend dissolved in methyl ethyl ketone or a solvent blend of methyl ethyl ketone and toluene; a methyl- and butyl- coetherified melamine-formaldehyde resin; and a blocked dinonyl naphthalene (mono) sulfonic acid catalyst in a solvent blend of butanol and 2-butoxyethanol, wherein said coating is dried and then exposed to temperatures of from about 375° F. to about 400° F., for a time of from about 15 to about 20 minutes.

* * * * *